United States Patent [19]

Ostrowski

[11] 4,248,270
[45] Feb. 3, 1981

[54] REDUCED NOISE WATER VALVE PROVIDED WITH FLOW CONTROL

[75] Inventor: E. A. Ostrowski, Mt. Prospect, Ill.

[73] Assignee: The Singer Company, Stamford, Conn.

[21] Appl. No.: 111,306

[22] Filed: Jan. 11, 1980

Related U.S. Application Data

[63] Continuation of Ser. No. 906,616, May 16, 1978, abandoned.

[51] Int. Cl.³ ............................ F15D 1/00; F15D 1/08
[52] U.S. Cl. ...................................... 138/45; 138/41; 138/46; 239/533.13; 239/533.7; 251/120; 137/504
[58] Field of Search ...................... 138/43, 45, 46, 41, 138/40, 42, 44; 239/533.13, 533.14, 533.7; 251/120; 137/504

[56] References Cited

U.S. PATENT DOCUMENTS

| | | | |
|---|---|---|---|
| 691,186 | 1/1902 | Schick | 138/43 |
| 2,289,905 | 7/1942 | Dasher | 138/43 X |
| 2,434,215 | 1/1948 | Mayer | 138/43 X |
| 2,489,542 | 11/1949 | Rosenblum | 138/45 |
| 2,829,674 | 4/1958 | Segelhorst et al. | 138/45 |
| 3,592,237 | 7/1971 | Borschers | 138/43 |
| 3,630,455 | 12/1971 | Parkison | 239/533.14 X |
| 3,768,507 | 10/1973 | Dicken | 138/45 |
| 4,011,893 | 3/1977 | Bentley | 138/45 X |

Primary Examiner—James E. Bryant, III
Attorney, Agent, or Firm—Bayard H. Michael

[57] ABSTRACT

The inlet to the water valve is provided with a resilient flow control device which deflects under pressure to reduce the inlet orifice and maintain substantially uniform flow. On the outlet side of the flow control the liquid is forced to turn at right angles to reach the multiple restricted orifices where the liquid again must turn 90°. At low pressures the flow is divided between 8 orifices 4 of which are gradually shut off by deflection of the flow control so at high inlet pressure the flow is divided among 4 orifices positioned in channels protecting them from being shut off by deflection of the flow control. The reduced velocity caused by the two 90° turns in flow results in substantial reduction of flow noise.

9 Claims, 7 Drawing Figures

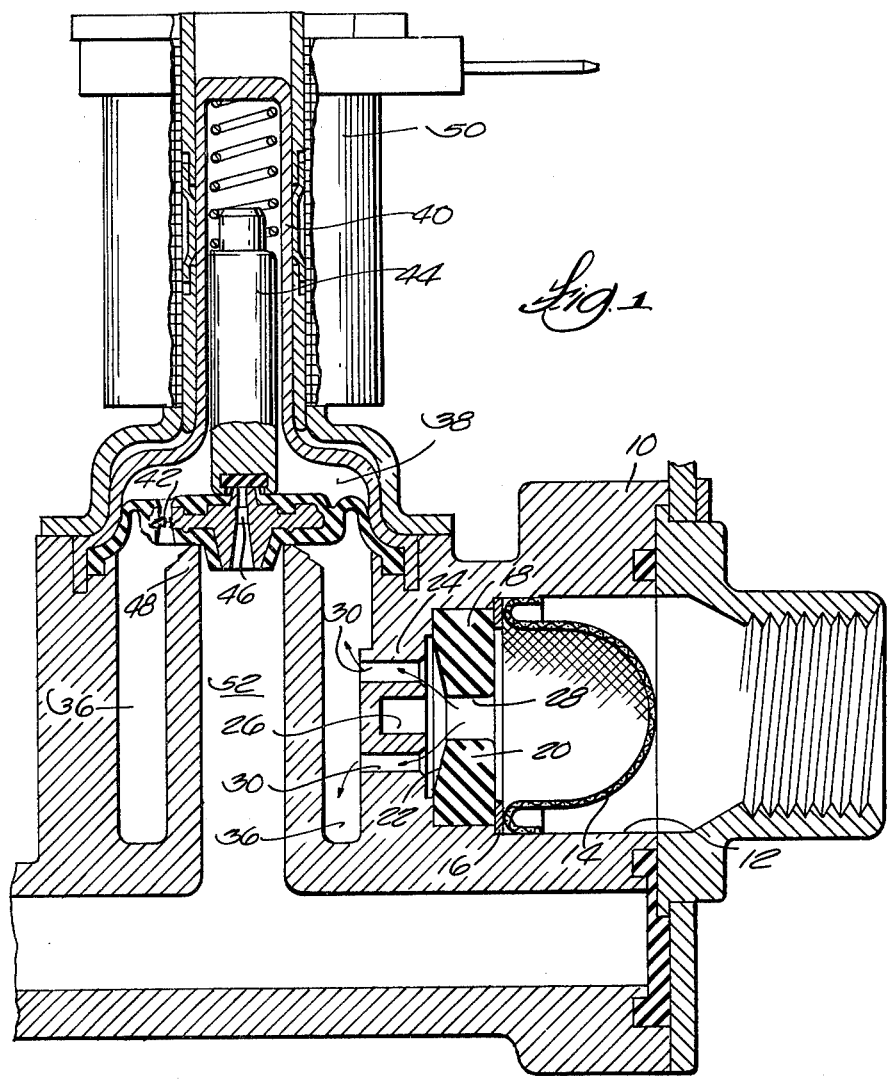
Fig. 1
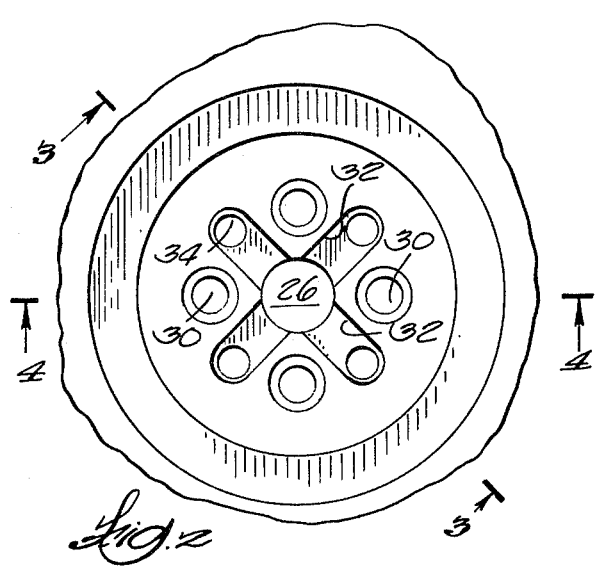
Fig. 2
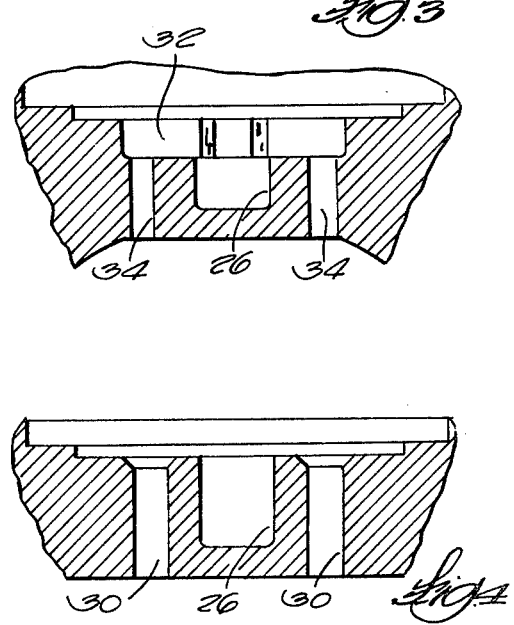
Fig. 3
Fig. 4

REDUCED NOISE WATER VALVE PROVIDED WITH FLOW CONTROL

This application is a continuation of application Ser. No. 906,616 filed on May 16, 1978 and abandoned in favor of this application.

FIELD OF THE INVENTION

Water valves of the type shown herein are employed in washing machines and dishwashers. The valves are generally provided with a flow control to keep the flow substantially uniform over a wide range of inlet pressures. As the flow control operates it causes changes in the flow velocity and various attempts at reducing flow noise have been made without great success and some resulted in "new" noise caused by flutter in the operation.

BACKGROUND PRIOR ART

The usual flow control is a resilient (rubber) annulus which deflects under pressure to decrease the central opening. One attempt at controlling noise was to place a domed or bullet nosed diffuser downstream of and in line with the flow control orifice to cooperate with the deflecting flow control in a throttling action. But as the flow control came close there was a tendency for the flow control to close on the diffuser momentarily and then pop open. This "flutter" caused a noise similar to water hammer. That approach was abandoned.

Another attempted solution was the provision of a metal disc diffuser downstream of the flow control and provided with 3 or 4 holes located around the center so water flowing through the central flow control orifice was diverted to the holes in the diffuser. This proved to be subject to flutter as the flow control flattened on the diffuser. The flow between the flow control and diffuser also reached very high velocities with consequent noise.

Another approach provides the flow control with three orifices spaced around the center (no central orifice) and the underside is provided with slots leading from each orifice to the center where flow is passed into the orifice in the valve body. This eliminates flutter and keeps flow velocity more reasonable but is still noisy.

SUMMARY OF THE INVENTION

The primary purpose of this invention is to reduce flow noise in water valves. Another object is to provide controlled flow with high inlet pressures and without valve flutter.

To achieve these ends I provide multiple orifices downstream of the flow control out of alignment with the flow control orifice so the water must make two 90° turns and is divided into multiple paths. To achieve satisfactory flow rates half of the multiple orifices originate in a surface contacted by the flow control as it deflects under higher pressures. Therefore those orifices are gradually closed off but the remaining orifices originate in recessed grooves and cannot be shut off by the flow control but the cross sectional area of the slots is subject to some reduction by partial deflection of the rubber flow control into slots. This results in the first group being closed with no flutter and there is a smooth reduction in available flow paths.

The number of noise control orifices may vary and the number subject to complete closure need not be the same as those in the slots. The slot length, width and depth are all subject to variation to achieve desired characteristics. The noise suppression can be achieved while tailoring the flow characteristics to various requirements. The holes and grooves are readily molded into the valve body or in an insert assembled into the valve body. The tolerances are easily provided in the rigid molded part as opposed to providing and maintaining close tolerances in a rubber flow control.

BRIEF DESCRIPTION OF THE DRAWINGS

FIG. 1 is a section through a typical solenoid operated water valve provided with the present diffusion noise reduction ports downstream of the flow control device.

FIG. 2 is a plan view of the noise reduction ports.
FIG. 3 is a section of FIG. 2 on line 3—3.
FIG. 4 is a section of FIG. 2 on line 4—4.

DESCRIPTION OF THE PREFERRED EMBODIMENT

Figure 5:
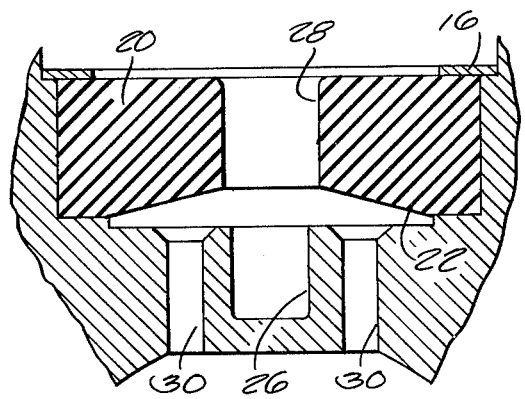
FIGS. 5–7 are semi-schematic representations of the manner in which flow is controlled by the present invention under low, middle and high pressure conditions.

The water valve shown in FIG. 1 will be described only to the extent necessary to establish the environment and function to the present invention. Valve body 10 has an inlet 12 in which the screen 14 is positioned on metal washer 16 upstream of rubber flow control 18. The flow control is annular with a flat face 20 upstream and a dished face 22 downstream. The peripheral portion of the downstream face seats on the flat upstream surface of partition 24. The partition has a blind hole 26 aligned with the central hole 28 in the flow control. Thus the partition has an annular surface around the blind hole 26. Four holes or ports 30 are spaced around the blind hole and extend through the partition from the upstream surface of the annular surface. Four radial grooves 32 are molded in the upstream side of the partition leading from the blind hole 26 and a hole 34 runs through the partition from the outer end of each groove. Holes 30 and 34 lead to an annular well 36 which is the inlet side of the diaphragm valve. The diaphragm 38 is fitted on the body with the space above the diaphragm sealed by member 40. The diaphragm has a small vent hole 42 positioned to let water flow through the diaphragm from the inlet well to the space above the diaphragm. When the armature/valve 44 seats on the central port 46 through the diaphragm the pressure above the diaphragm builds up and closes the diaphragm on seat 48. When coil 50 is energized the armature lifts to open port 46 which drops the pressure above the diaphragm and allows inlet pressure to move the diaphragm off the seat 48 to establish flow to outlet 52.

Figure 6:
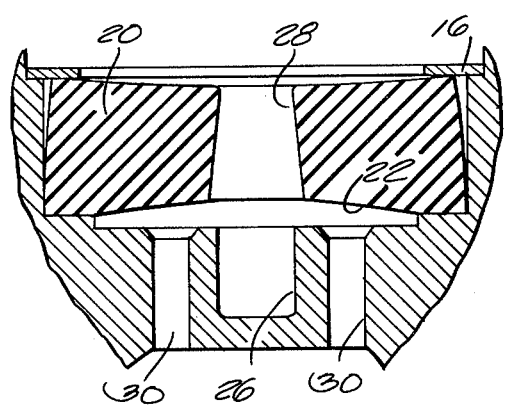
Figure 7:
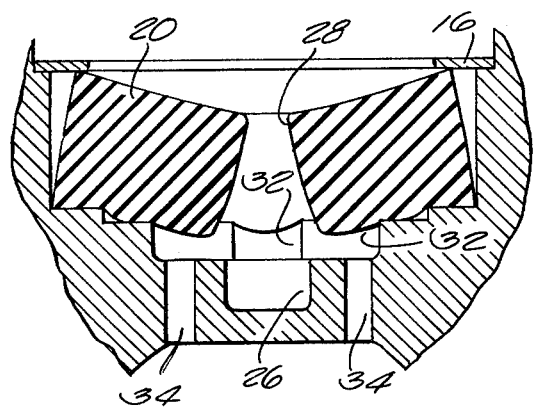

With low inlet pressure in inlet 12 the rubber flow control does not deflect appreciably and the downstream face of the flow control 20 is spaced from the partition as shown in FIG. 1. Therefore, water flows through the central orifice 28 and must turn 90° to reach either ports 30 or 34 where it again turns 90° to flow through all eight ports (FIG. 5). As the inlet pressure increases the rubber flow control is deformed to bring the dished downstream face closer to the annular surface of the partition, thus reducing the area leading to ports 30 until the ports are finally closed off. In the meantime the central orifice of the flow control is deformed inwardly to reduce the hole size (FIG. 6). With the ports 30 fully closed off the flow to the high pressure holes is unobstructed since the grooves 32 function as lateral feeds to the holes. If the inlet pressure increases further the rubber flow control will be deformed into the grooves to some extent (FIG. 7) to reduce the effective cross sectional area of the grooves and thus reduce flow to the ports 34. In the meantime the upstream side of the central orifice in the flow control is further restricted.

From the foregoing it will be appreciated that at low inlet pressure the water flowing through the flow control is divided among eight ports and is required to make two 90° turns. The net effect is a substantial reduction in noise. As the inlet pressure builds up the low pressure ports 30 are gradually closed off by the flow control deforming and pressing against the upstream annular face of the partition. There is no tendency to flutter since the flow rate just prior to closing ports 30 is not very great because adequate flow can take place through ports 34. Therefore there is no tendency to pull the flow control onto ports 30 and then pop open. After closure of ports 30 the flow path to ports 34 is subject to gradual restriction with increasing inlet pressure as the flow control deforms into the grooves. Flow velocity remains rasonable and noise is reduced throughout the normal operating pressure range.

It will be appreciated the ported partition could be fabricated as a separate piece and assembled into a valve body. The term partition is used in the sense of meaning an integral or separate partition. The number and size of the ports can be varied as can the dimensions of the grooves to adjust flow rates and noise reduction. It does not take much imagination to visualize various groove depths in a single unit to get more progressive (or variable) results. Similarly various sized holes may be desirable. It is possible to seat the flow control on a shoulder spacing the flow control a bit further from the face of the partition and obtaining still further variation or tailoring of performance. All such variables are within the scope of this invention and constitute fine tuning of the device to the requirements at hand.

I claim:

1. The combination with a water valve having a body provided with an inlet and a resilient centrally apertured flow control device mounted in the inlet and having a dashed downstream face and deformed by inlet pressure to provide generally uniform flow through the device with varying inlet pressure, of means for reducing the flow noise comprising, a partition in the inlet, downstream of the flow control device, having a blind hole therein in alignment with the central aperture of the flow control device surrounded by an annular surface which is engaged by the dished downstream face of the flow control device as the device deflects under inlet pressure, a plurality of first ports through the partition from said annular surface to the outlet side of the partition and subject to being closed off by said flow control device as the flow control device deflects against the annular surface, a plurality of grooves in said annular surface, one end of each groove communicating with said blind hole to receive flow passing through the flow control device under all flow conditions, and a plurality of second ports through the partition each located in one of said grooves remote from the blind hole and leading to the outlet side of the partition.

2. The combination of claim 1 in which the flow control device is subject to some deflection into said grooves under high inlet pressure whereby the cross sectional area of the grooves is reduced under such conditions.

3. The combination according to claim 2 in which the flow control device has a central aperture and all of said ports are located out of alignment with said central aperture.

4. The combination according to claim 3 in which the first ports are substantially equally spaced about the center of the partition.

5. The combination according to claim 4 in which said grooves radiate from the center of said partition.

6. The combination according to claim 5 in which the end wall of said blind hole in the partition in alignment with the central aperture in the flow control device is solid so water passing through the flow control device impinges thereon and is deflected thereby.

7. The combination with a water valve having a body provided with an inlet and a resilient centrally apertured flow control device mounted in the inlet and having a dished downstream face and deformed by inlet pressure to provide generally uniform flow through the device with varying inlet pressure, of means for reducing the flow noise comprising, a partition in the inlet downstream of the flow control device and having a blind hold therein in alignment with the central aperture of the flow control device surrounded by an annular surface which is engaged by the dished downstream face of the flow control device as the device deflects under inlet pressure, a plurality of first ports through said partition from said annular surface to the outlet side of the partition, a plurality of passages in said partition receiving flow from the blind hole, a port in each passage leading through the partition, and all of said ports being located out of alignment with flow through the flow control device.

8. The combination according to claim 7 in which the flow control device deflects under increasing inlet pressure to progressively close off said first ports and thereafter progressively restrict said passages.

9. The combination according to claim 8 in which one side of each of said passages is open to said surface of said partition and the flow control device is subject to deformation into each passage when subjected to high inlet pressure.

* * * * *

UNITED STATES PATENT AND TRADEMARK OFFICE
CERTIFICATE OF CORRECTION

PATENT NO. : 4,248,270
DATED : February 3, 1981
INVENTOR(S) : E. A. Ostrowski

It is certified that error appears in the above—identified patent and that said Letters Patent are hereby corrected as shown below:

In The Claims

Claim 1, line 48, change "dashed" to --dished--.

Claim 7, line 38, change "hold" to --hole--.

Signed and Sealed this

Twenty-first Day of April 1981

[SEAL]

Attest:

RENE D. TEGTMEYER

Attesting Officer    Acting Commissioner of Patents and Trademarks